(12) United States Patent
Takeshita et al.

(10) Patent No.: US 7,463,826 B2
(45) Date of Patent: Dec. 9, 2008

(54) APPARATUS FOR MEASURING RESPONSE TIME AND METHOD OF MEASURING OF RESPONSE TIME USING THE SAME

(75) Inventors: Fusayuki Takeshita, Seoul (KR); Hiroyuki Kamiya, Seongnam-si (KR); Kyeong-Hyeon Kim, Yongin-si (KR); Yong-hwan Shin, Yongin-si (KR); Hak-sun Chang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 513 days.

(21) Appl. No.: 11/224,998

(22) Filed: Sep. 14, 2005

(65) Prior Publication Data

US 2006/0139269 A1  Jun. 29, 2006

(30) Foreign Application Priority Data

Dec. 24, 2004 (KR) ................. 10-2004-0112127

(51) Int. Cl.
*G03B 17/48* (2006.01)

(52) U.S. Cl. ............... 396/429; 324/71.1; 324/602; 324/603; 324/770; 345/87; 438/14; 438/17; 438/18

(58) Field of Classification Search ............ 396/429; 252/299.63, 299.66; 324/71.1, 160, 601, 324/602, 603, 770; 250/206, 208.1, 252; 345/87, 88–105, 108; 438/14, 17, 18

See application file for complete search history.

(56) References Cited

U.S. PATENT DOCUMENTS

| | | | | |
|---|---|---|---|---|
| 5,204,617 A | * | 4/1993 | Kumagai | 324/770 |
| 5,764,209 A | * | 6/1998 | Hawthorne et al. | 345/87 |
| 6,513,894 B1 | * | 2/2003 | Chen et al. | 347/11 |
| 6,545,500 B1 | * | 4/2003 | Field | 324/770 |
| 2002/0009744 A1 | * | 1/2002 | Bogdanov | 435/6 |
| 2002/0088952 A1 | * | 7/2002 | Rao et al. | 250/559.45 |
| 2003/0117131 A1 | * | 6/2003 | Ham | 324/160 |
| 2004/0263450 A1 | * | 12/2004 | Lee et al. | 345/87 |
| 2005/0068057 A1 | * | 3/2005 | Iwasaki et al. | 324/770 |
| 2006/0028233 A1 | * | 2/2006 | Arazaki | 324/770 |
| 2006/0030432 A1 | * | 2/2006 | Katayama | 473/407 |

FOREIGN PATENT DOCUMENTS

| | | |
|---|---|---|
| KR | 1998-023043 | 7/1998 |
| KR | 2003-0048953 | 6/2003 |

* cited by examiner

*Primary Examiner*—W. B. Perkey
*Assistant Examiner*—Warren K Fenwick
(74) *Attorney, Agent, or Firm*—Cantor Colburn LLP (57) ABSTRACT

An apparatus for measuring response time of a display apparatus including a photographing part including a charge coupled device camera and a microscope, an image processing part receiving a picture taken from a photographing part and calculating the response time thereof, and a control part applying a predetermined image signal to the display apparatus and controlling the photographing part to take a picture change of the display apparatus at a predetermined time.

27 Claims, 9 Drawing Sheets

APPARATUS FOR MEASURING RESPONSE TIME AND METHOD OF MEASURING OF RESPONSE TIME USING THE SAME

CROSS-REFERENCE TO RELATED APPLICATIONS

This application claims the benefit of Korean Patent Application No. 10-2004-0112127, filed on Dec. 24, 2004, in the Korean Intellectual Property Office, which is hereby incorporated by reference for all purposes as if fully set forth herein.

BACKGROUND OF THE INVENTION

1. Field of the Invention

The present invention relates to an apparatus for measuring response time and a method of measuring response time using the same, and more particularly, to an apparatus for measuring response time and a method of measuring response time using the same, which measures response time in an area that is less than a pixel size.

2. Description of the Related Art

Generally, a liquid crystal display (LCD) is used as flat panel display because it is relatively thin, light weight, and consumes less power than a cathode ray tube (CRT). As the liquid crystal display is applied to the display field of a display apparatus that displays moving images, a response time of liquid crystals is important.

A response time of liquid crystal includes a rising time and a falling time. The rising time is defined as a time that leads 10% to 90% of a permeation ratio at a normally black mode. A falling time is defined as a time that leads 90% to 10% of a permeation ratio at a normally black mode. Slow response time of liquid crystal causes motion blurring on the liquid crystal display and affects the quality of a display device adversely.

A multi-domain mode, such as vertical alignment (VA), has recently been applied to the liquid crystal display to improve a viewing angle of the liquid crystal display. The multi-domain mode has various response times even in one-pixel showing a color because the one-pixel is divided into multiple domains. Overall response time of the multi-domain mode is determined by the slowest response time of the multiple domains. Thus, it is important to measure response time in the area that is less than a pixel size to determine which domain has the slowest response time.

A conventional apparatus for measuring response time uses a photo multiplier or a photo diode. Such conventional apparatus for measuring response time measures an overall luminance of the display screen. Thus, the apparatus may not measure response time in the area that is less than the pixel size.

SUMMARY OF THE INVENTION

Accordingly, it is an aspect of the present invention to provide an apparatus for measuring response time and a method of measuring response time using the same which measures response time in the area less than a pixel size.

Additional features of the invention will be set forth in the description which follows, and in part will be apparent from the description, or may be learned by practice of the invention.

The invention discloses an apparatus for measuring a response time of a display apparatus, including a photographing part taking a picture, the photographing part including a charge coupled device camera and a microscope, an image processing part receiving the picture taken by the photographing part and calculating the response time, and a control part applying a predetermined image signal to the display apparatus and controlling the photographing part to take a picture change of the display apparatus at a predetermined time.

The invention further discloses a method for measuring response time of a display apparatus, including transmitting a predetermined image signal to the display apparatus, photographing a change of a display apparatus at a predetermined interval of time according to the predetermined image signal, and calculating the response time by processing the photograph.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the embodiments of the present invention, examples of which are illustrated in the accompanying drawings, wherein like reference numerals refer to like elements throughout.

Figure 1:
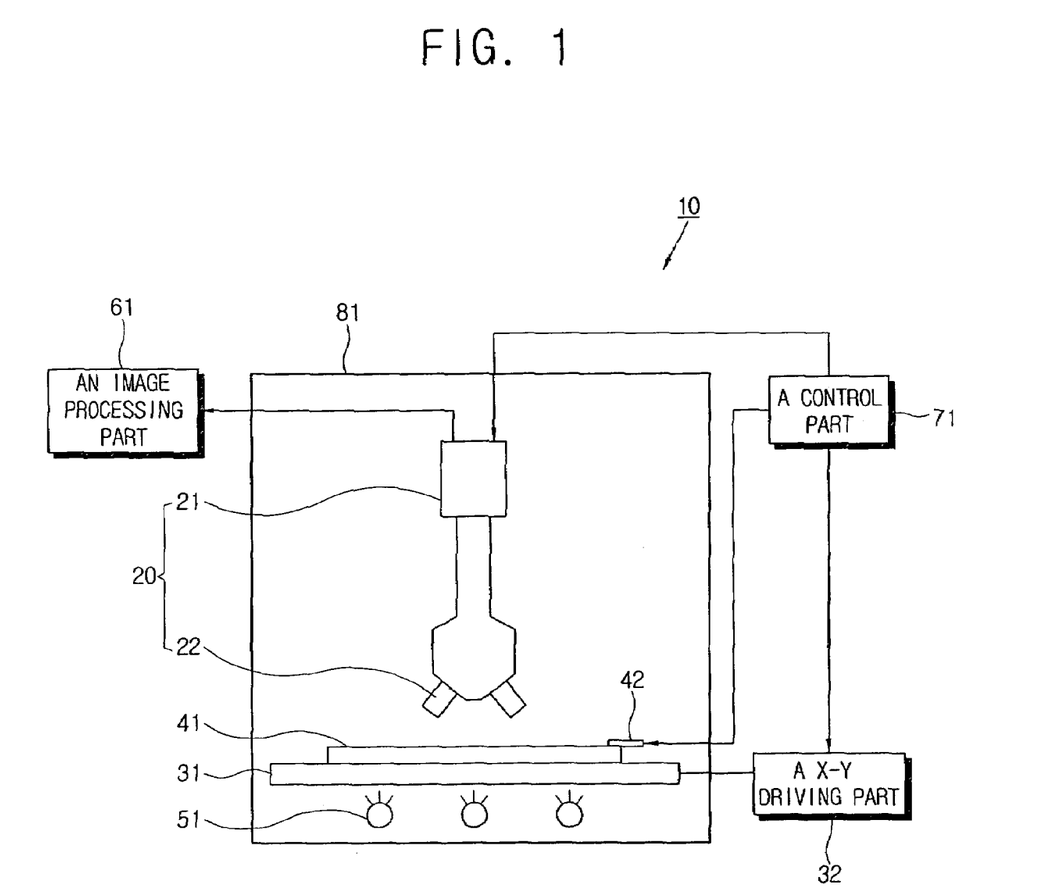
FIG. 1 is a schematic view showing an apparatus for measuring response time according to an embodiment of the invention.

As shown in FIG. 1, an apparatus for measuring response time 10 includes a photographing part 20 that has a charged coupled device (CCD) camera 21 and a microscope 22, a table 31 located under the photographing part 20. A liquid crystal display panel 41 is provided on the table 31 and is a measurement object. An x-y driving part 32 is provided to shift the table 31 in a direction of the x and y axes. A lamp unit 51 is located under the table 31 and supplies light to the liquid crystal display panel 41. An image processing part 61 receives and processes a picture or image taken by the photographing part 20. A control part 71 controls the photographing part 20, the x-y driving part 32, the liquid crystal display panel 41, and a temperature chamber 81 accommodating the table 31.

The CCD camera 21 has many fine pixels and may record the luminance change of the measurement object for each pixel. The shutter interval of the CCD camera 21, e.g., a frame rate, may be less than 1 ms, and is preferably less than 0.1 ms. The CCD camera 21 may also distinguish colors for each pixel of the liquid crystal display panel 41. The CCD camera 21 may be a color CCD camera.

The microscope 22 connected with the CCD camera 21 operates with the CCD camera 21 such that the photographing unit 20 is able to take a picture in the area that is less than a pixel size of the liquid crystal display panel 41. The microscope 22 may assist the CCD camera 21 to take a picture of less than a 10 μm diameter of a pixel.

The table 31 supports the liquid crystal display panel 41 and the table 31 shifts or moves in an x-axis direction and y-axis direction by way of the x-y driving part 32. The apparatus for measuring response time 10 may take a picture of a different portion or region of the liquid crystal display panel 41 by moving the table 31 controlled by the x-y driving part 32.

The lamp unit 51 provides light for the liquid crystal display panel 41. The table 31 may be made of a transparent material so that light may pass through.

The image processing part 61 analyzes a picture taken from the photographing part 20 and calculates the response time in the area that is less than a pixel size.

The control part 71 controls the photographing part 20, the x-y driving part 32 and the liquid crystal display panel 41. The control part 71 applies a predetermined picture signal (all white or all black signal) to the liquid crystal display panel 41 through a panel driver 42 that is connected with the liquid crystal display panel 41 at a predetermined time interval. Further, the control part 71 controls the photographing part 20 to take a picture of the picture changes on the liquid crystal display panel 41 according to the picture signal at a predetermined time. The control part 71 may change the picture-taking position of the photographing part 20 by way of controlling the x-y driving part 32 as necessary. The control part 71 transmits information of a taken-picture, such as a time that the picture was taken, to the image processing part 61.

When the panel driver 42 is not connected with the liquid crystal display panel 41, the apparatus for measuring response time 10 may include another panel driver.

The temperature chamber 81 may accommodate the table 31, the photographing part 20, the lamp unit 51 and the liquid crystal display panel 41. The liquid crystal display panel 41 may be accommodated in the temperature chamber 81 to measure response time at a constant temperature because the response time of liquid crystal is sensitive to temperature changes. The apparatus for measuring response time 10 may include a temperature controller (not shown) controlling the temperature of the temperature chamber 81. The control part 71 would control the temperature controller.

According to an embodiment of the invention, the liquid crystal display panel 41 is a multi-domain mode with PVA (patterned vertical alignment).

Figure 2:
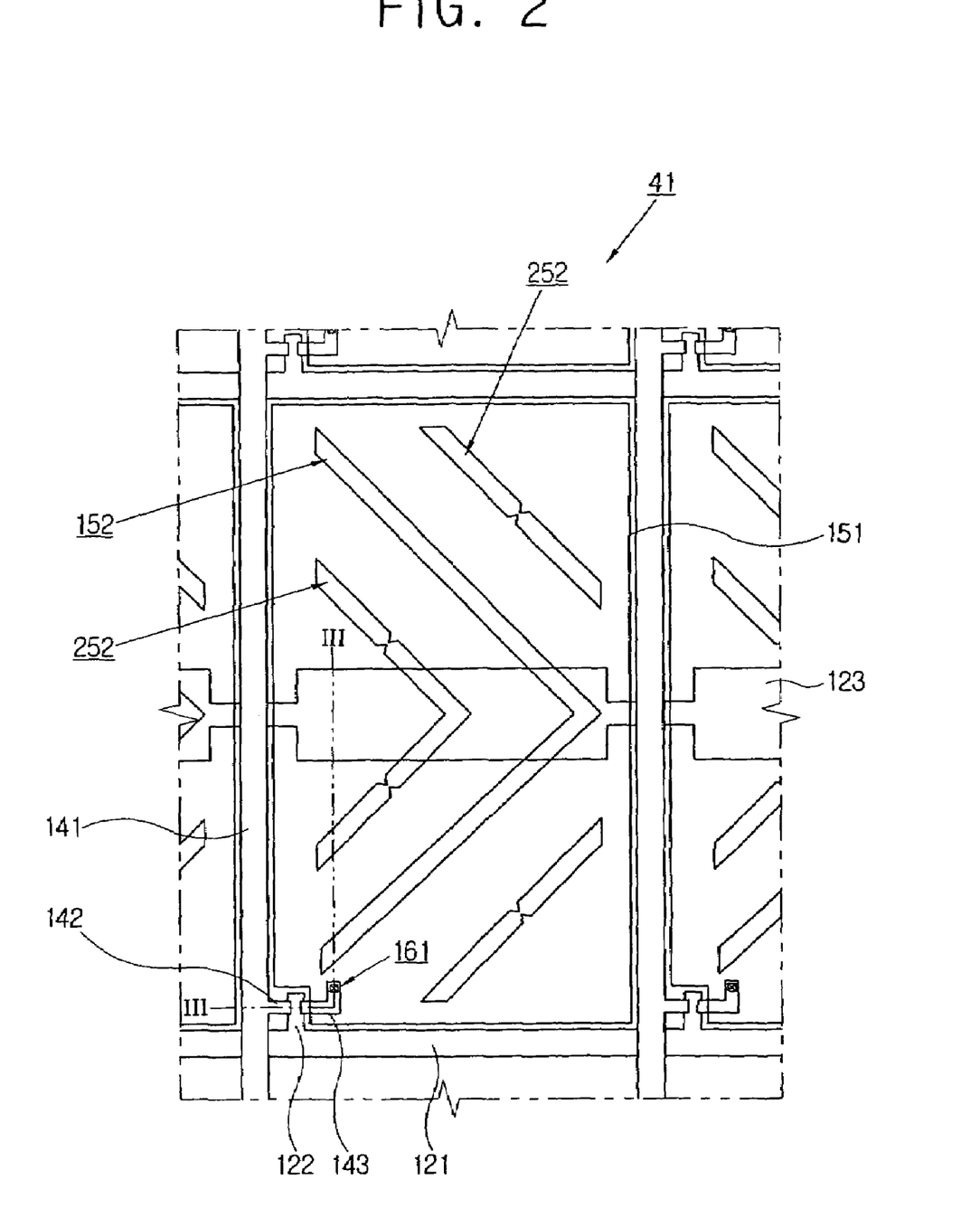
FIG. 2 is a schematic view showing a liquid crystal display panel as a measurement object for measuring the response time.
Figure 3:
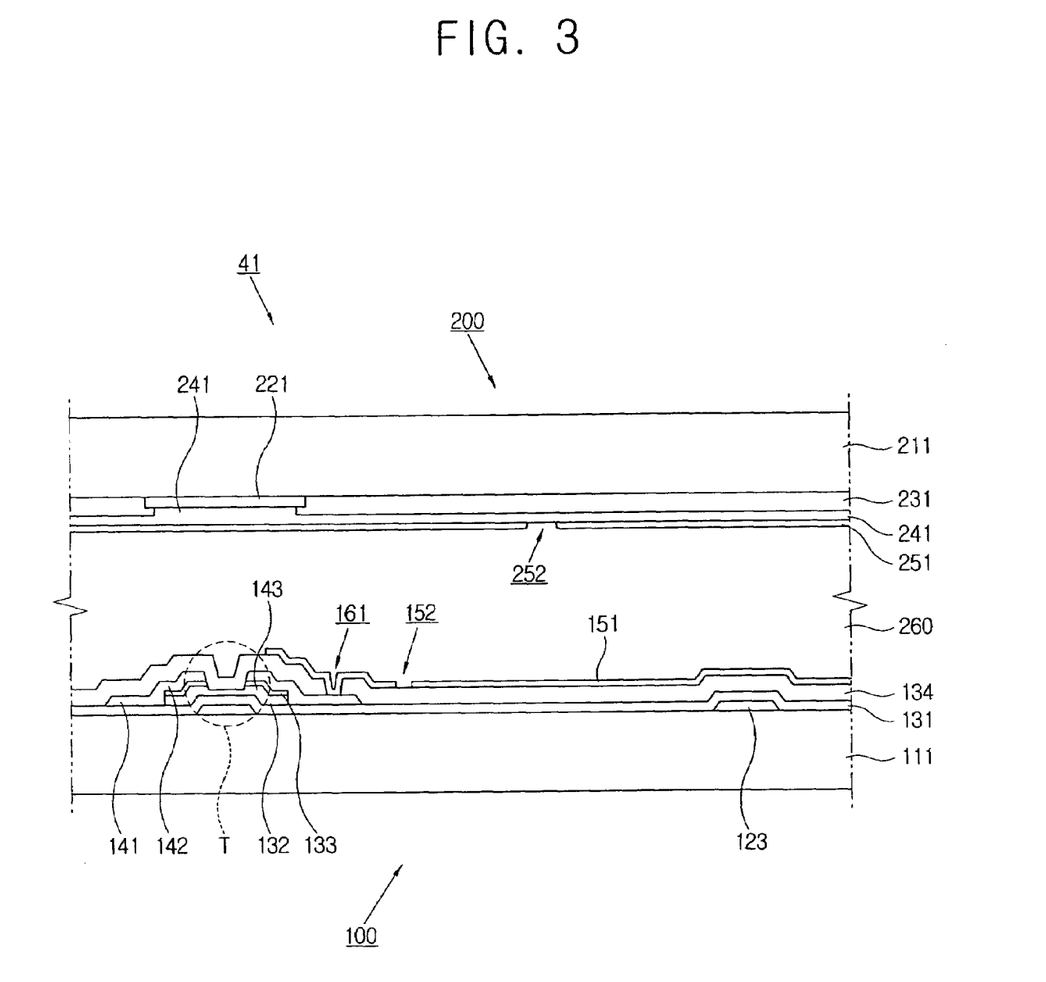
FIG. 3 is a sectional view taken along III-III of FIG. 2.

FIG. 2 is a schematic view showing the liquid crystal display panel 41 as a measurement object. FIG. 3 is a sectional view taken along III-III of FIG. 2.

The liquid crystal display panel 41 includes a thin film transistor (TFT) substrate 100, a color filter substrate 200, and a liquid crystal layer 260 sandwiched between the TFT substrate 100 and the color filter substrate 200. In the TFT substrate 100, a gate wire 121, 122, 123 is formed on a first insulating substrate 111. The gate wire 121, 122, 123 may have comprised a single or multiple metal layers. As shown in FIG. 2, but not limited thereto, the gate wire 121, 122, 123 includes a gate line 121 extending to a horizontal direction, a gate electrode 122 forming a TFT Q and connected to the gate line 121 and a common electrode line 123 forming storage capacity by being provided on a pixel electrode layer 151.

A gate insulating layer 131, which may be made with SiNx, is provided on the gate wire 121, 122, 123, and on the first insulating substrate 111.

A semiconductor layer 132 is formed on the gate insulating layer 131 of the gate electrode 122. An ohmic contact layer 133 is formed on the semiconductor layer 132 and may be formed with n+ hydrogenated amorphous silicon that is highly doped with n-type impurities. The ohmic contact layer 132 may be divided into two regions on the gate electrode 122.

A data wire 141, 142, 143 includes a data line 41 formed on the ohmic contact layer 133 and the gate insulating layer 131. The data wire 141, 142, 143 may have a single layer or multiple metal layers. The data wire 141, 142, 143 may be formed at a vertical direction crossing the gate line 121 to define a pixel, a data wire 142, e.g., a source electrode, extending from the data line 141 and extending over the ohmic contact layer 133, and a data wire 143, e.g., a drain electrode separate from the source electrode 142 and formed over the ohmic contact layer 133 while being positioned adjacent to the source electrode 142 across the gate electrode 122.

A protective layer 134 is provided on the data wire 141, 142, 143 and an upper portion of the semiconductor layer 132, which is not covered with the data wire 141, 142, 143, wherein the protective layer 134 may be made of a SiNx layer, an a-Si:C:O layer, a-Si:O:F layer, an acryl-based organic insulating layer, or the like. The a-Si:C:O layer and the a-Si:O:F layer are formed through PECVD (plasma enhanced chemical vapor deposition). The protective layer 134 has a contact hole 161 to expose the drain electrode 143.

A pixel electrode layer 151 is formed on the protective layer 134. The pixel electrode layer 151 may be made of the transparent electric conduction material, such as ITO (indium tin oxide) or IZO (indium zinc oxide).

A pixel electrode cutting pattern 152 is formed on a pixel electrode layer 151. The pixel electrode cutting pattern 152 and a common electrode cutting pattern 252 (to be described later) divide a liquid crystal layer 260 into multiple domains.

The color filter substrate 200 includes a black matrix 221 provided on a second insulating substrate 211, a color filter layer 231 provided on each pixel, e.g., alternating red, green, and blue (RGB), with the black matrix 221 provided therebetween, an overcoat layer 241 provided on the color filter layer 231 and the black matrix 221 which is not completely covered with the color filter layer 231, and a common electrode layer 251 provided on the overcoat layer 241.

The black matrix 221 divides red, green and blue filters (RGB) and intercepts direct irradiation of the light traveling to the TFT Q. The black matrix 221 may be made of a photoresist organic material that includes, for example, a black paint. The black paints may be a chrome(Cr) or a chrome oxide($CrO_2$).

The color filter layer 231 applies colors to the light traveling through the liquid crystal layer 260 from a backlight unit(not shown). The color filter layer 231 is made with photoresist organic material.

The overcoat layer 241 substantially levels the color filter layer 231 and protects the color filter layer 231. The overcoat layer 241 may be made with an acryl-based epoxy material.

The common electrode layer 251 applies a voltage to the liquid crystal layer 260, similar to the pixel electrode 151 of the TFT substrate 100. The common electrode layer 251 is made with the transparent electric conduction material, such as ITO (indium tin oxide) or IZO (indium zinc oxide). The common electrode cutting pattern 252 is formed on the common electrode layer 251 and divides the liquid crystal layer 260 into multiple domains, similar to the pixel electrode cutting pattern 152 formed on the pixel electrode layer 151.

The pixel electrode cutting pattern 152 and the common electrode cutting pattern 252 may be formed with various patterns. For example, the pixel electrode cutting pattern 152 and the common electrode cutting pattern 252 may be formed oblique or perpendicular to the common electrode layer 251 and the pixel electrode layer 151, respectively.

The liquid crystal layer 260 is formed in a space between the TFT substrate 100 and the color filter substrate 200. The liquid crystal layer 260 changes its alignment according to electric fields generated by the pixel electrode 151 and the common electrode layer 251. The transmittance of light is controlled by the alignment of the liquid crystal layer 260 therebetween.

The liquid crystal layer 260 may be a VA (vertically aligned) mode liquid crystal layer. For example, in the VA mode, a liquid crystal molecule of the liquid crystal layer 260 is aligned substantially vertical between the TFT substrate 100 and the color filter substrate 200 when no voltage is applied thereto. The liquid crystal molecule of the liquid crystal layer 260 is aligned substantially vertical to electric fields because an anisotropic dielectric constant of the liquid crystal molecules is negative.

Alternatively, when the pixel electrode cutting pattern 152 and the common electrode cutting pattern 252 are not be formed on the pixel electrode layer 151 and the common electrode layer 251, respectively, the liquid crystal molecule not properly aligned because the angle of direction for alignment is not set and disclination occurs where the alignment of the liquid crystal molecule is different when an electric field is applied thereto. Disclination causes light scattering and adversely affects the apparatus. For example, a fringe field is formed by the pixel electrode cutting pattern 152 and the common electrode cutting pattern 252 when the voltage is applied to the liquid crystal layer 260. The fringe field settles the angle of direction for alignment. As previously described, the liquid crystal layer 260 is divided into multiple domains by the arrangement of the pixel electrode cutting pattern 152 and the common electrode cutting pattern 252.

Figure 4:
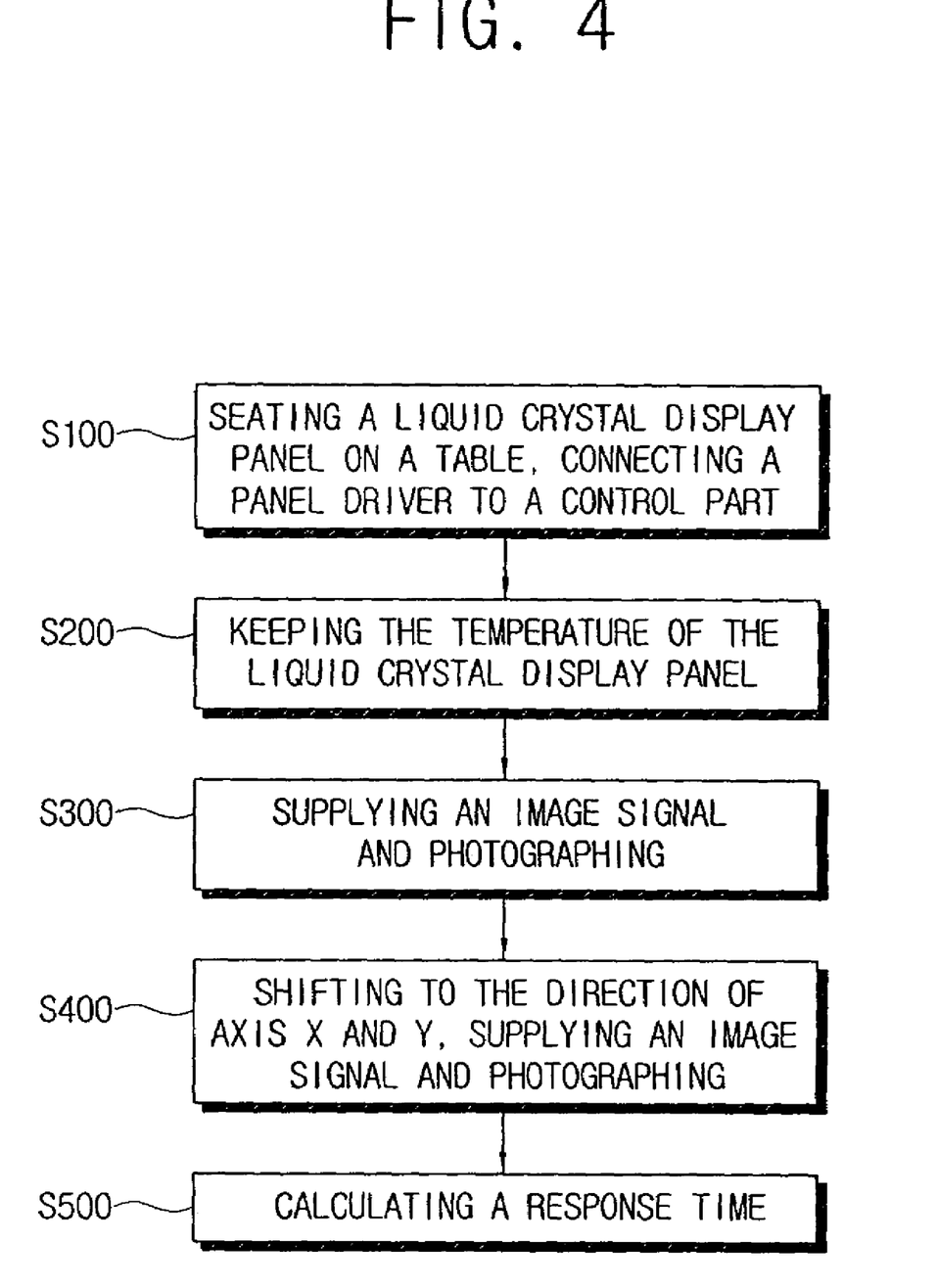
FIG. 4 is a flow chart showing a method of measuring the response time using the apparatus for measuring the response time shown in FIG. 1.

Referring to FIG. 4, a method of measuring response time using a apparatus for measuring response time is discussed according to the embodiment of the invention discussed above and shown in FIG. 1; however the invention is not limited thereto.

The liquid crystal display panel 41 is provided on the table 31 and the panel driver 42 is connected with the control part 71 at operation S100. The control part 71 controls the temperature of the temperature chamber 81 that accommodates the table 31, the liquid crystal display panel 41 and the lamp unit 51, to keep the temperature at a sufficient temperature. For example, the temperature of the temperature chamber 81 may be controlled to be between 25° C. or 30° C. at operation S200.

The control part 71 supplies image signals to the panel driver 42 and repeatedly changes all-black pixels with all-white pixels on the screen of the liquid crystal display panel 41 at a predetermined time. The photographing part 20 takes a picture of changes on the screen of the liquid crystal display panel 41 at a predetermined time at operation S300. For example, the shutter interval of the photographing part 20 may be less than 1 ms; preferably, the shutter interval is less than 0.1 ms.

The control part 71 subsequently controls the x-y driving part 32 shifting the table 31 to the x-axis and/or y-axis direction and repeatedly supplies image signals and photographs to be processed by the image processing part 61 at operation S400.

The image processing part 61 analyzes a picture taken from the photographing part 20 and calculates the response time thereof at operation S500.

The result of the luminance change and the response time is described below according to the time and position of the liquid crystal display panel 41.

Figure 5:
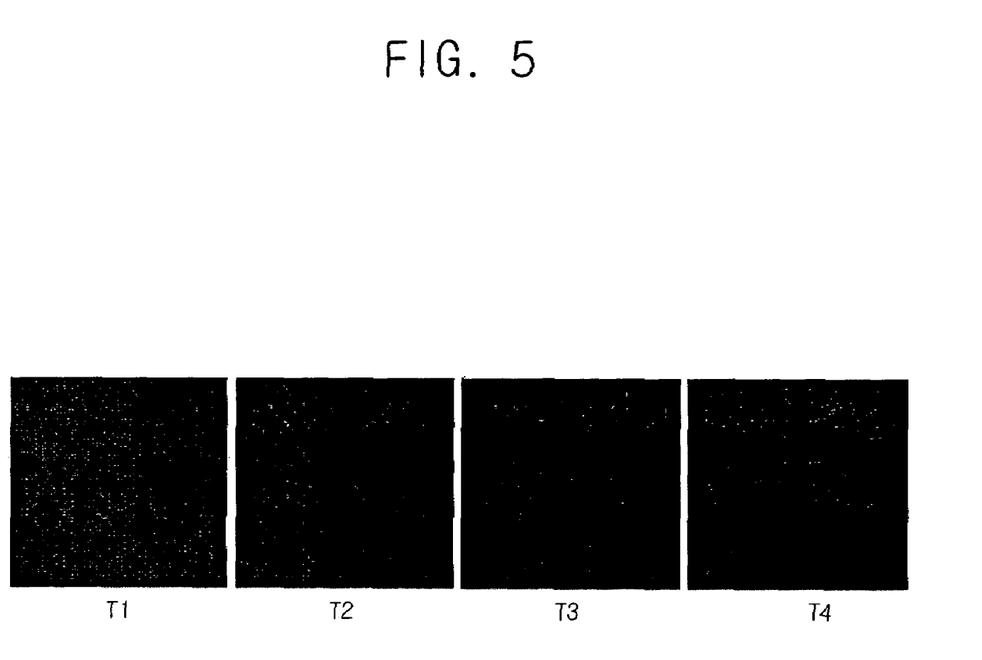
FIG. 5 is a picture showing a luminance of a liquid crystal display panel change according to time.

FIG. 5 is a picture showing the luminance change according to time in a pixel of the liquid crystal display panel 41. In FIG. 5 shows each picture taken of a pixel at a predetermined time of T1, T2, T3, and T4, respectively, when an all black state changes to an all white state. FIG. 5 shows that the luminance of a pixel is not constant according to the time change and the luminance is not constant at each position of the pixel. Some positions of the pixel obtain a final luminance in a short amount of time and other positions of the pixel obtain the final luminance in a longer amount of time.

The change of luminance is not constant according to the pixel and the various positions within the pixel. Thus, it is not accurate to measure the response time of an entire unit of a pixel.

Figure 6:
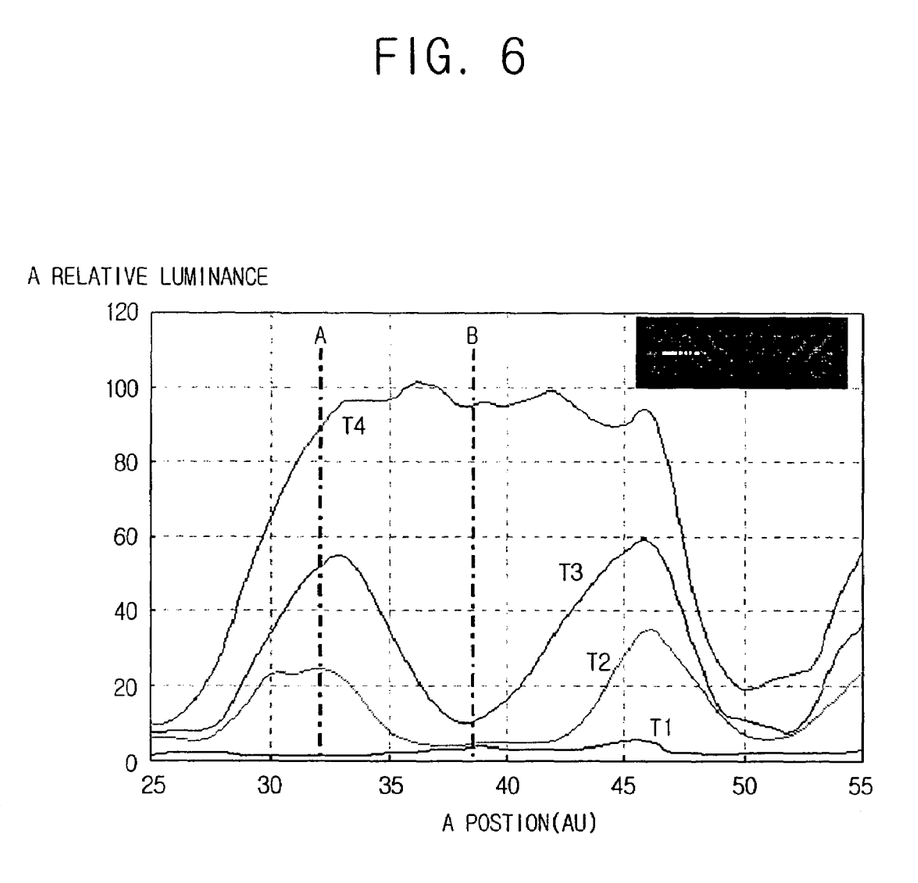
FIG. 6 and FIG. 7 are graphs showing the luminance change according to a positional change of the liquid crystal display panel.
Figure 7:
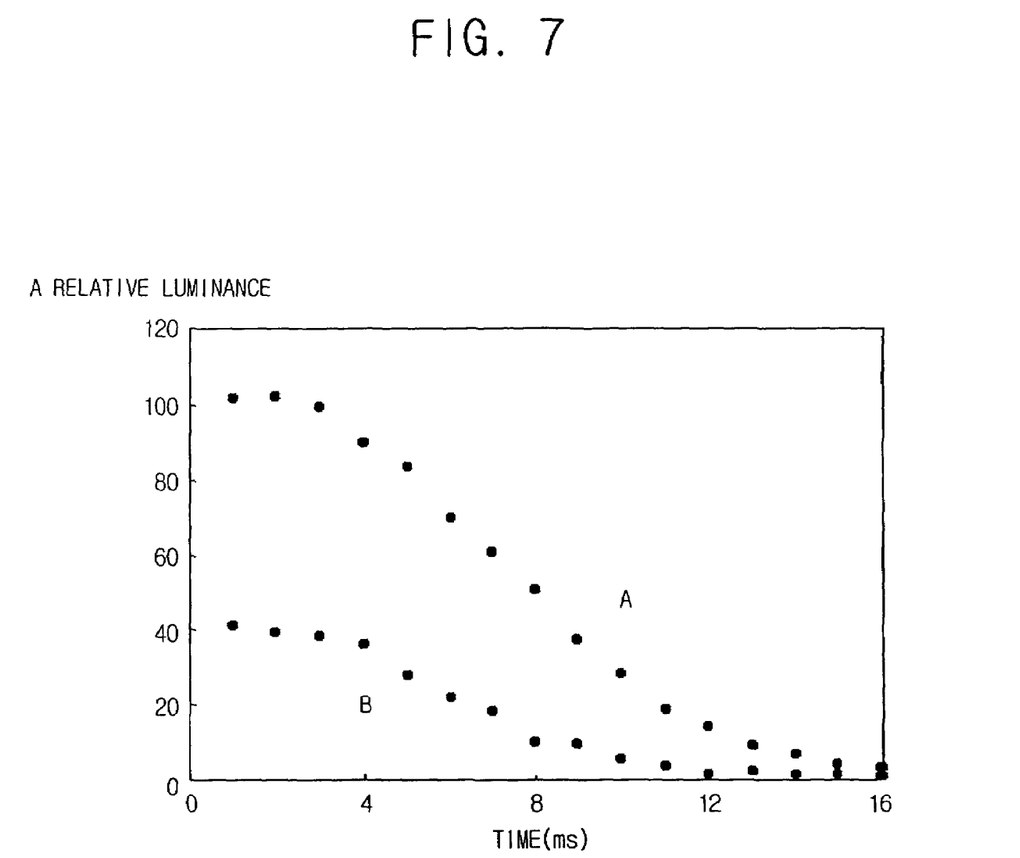
Figure 8:
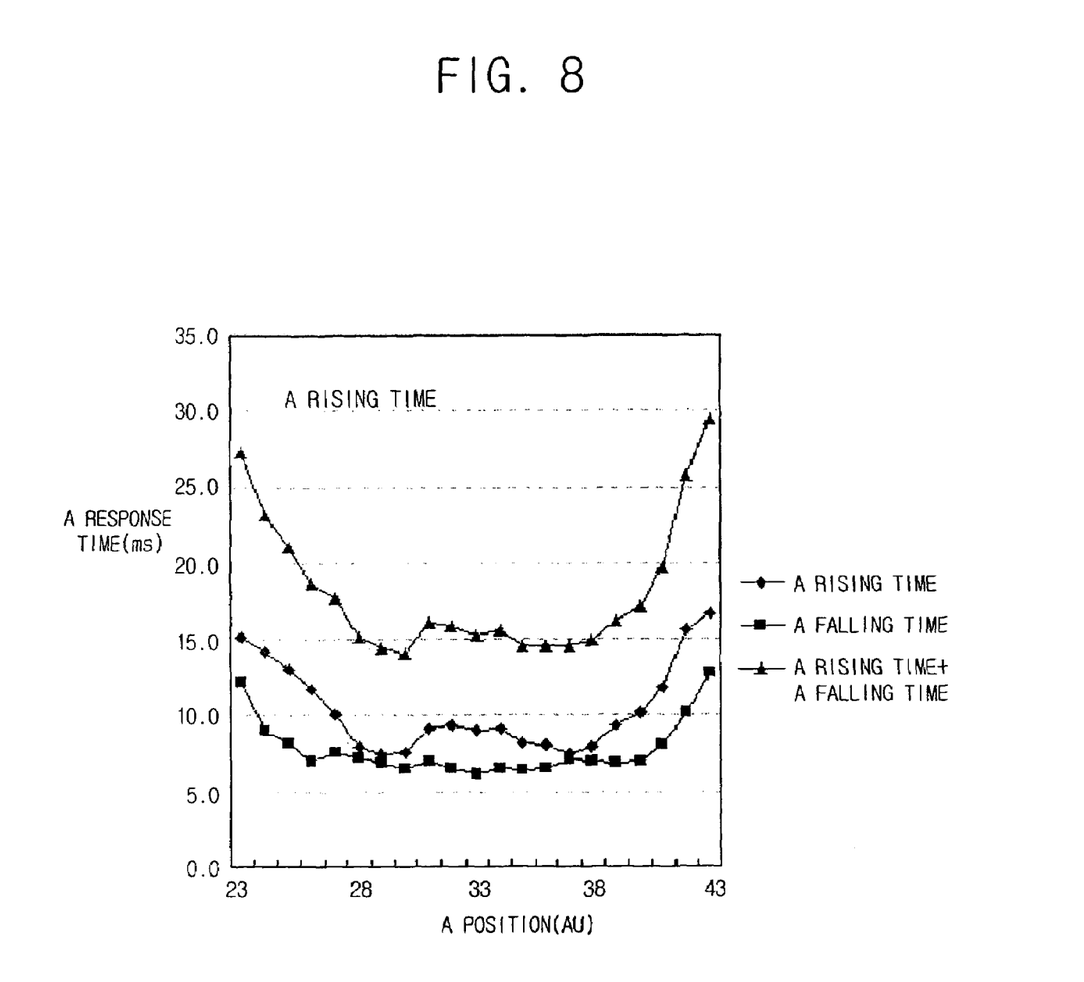
FIG. 8 is a graph showing the response time according to a positional change of the liquid crystal display panel.

FIGS. 6 and 7 are graphs showing the luminance change according to a change of the position on the liquid crystal display panel 41. FIG. 8 is a graph showing the response time change according to a change of the position on the liquid crystal display panel 41.

FIG. 6 shows the luminance change of the white area on pixel picture when the pixels are converted from all-black to all-white. The axis x is an arbitrary unit showing the position in the pixel and axis y is the relative luminance. Point A and point B are neighboring portions in a pixel and the luminance of point A and point B is similar. However, the luminance change with the progress of time is different. Specifically, the luminance of point A is much greater than the luminance of point B at the T1 and this luminance difference between point A and point B is getting bigger at T2 and T3. The luminance of point B increases rapidly and becomes similar to the luminance of point A at T4. With this apparatus for measuring response time, it is possible to know how to change the luminance at each point under the level of a pixel size and less.

FIG. 7 is a graph showing the luminance change in a same pixel when the pixel is converted from all-white to all-black. When measuring the luminance change, the temperature of the liquid crystal display panel 41 is maintained at approximately 25° C. and the shutter interval is approximately 1 ms. The falling times calculated from the luminance change are 8.95 ms at point A and 7.31 ms at point B. Thus, FIG. 7 shows that response times are different with respect to a position in a pixel. FIG. 6 and FIG. 7 additionally show that the luminance of a pixel may not be constant at each position in the pixel. Accordingly, it may not be necessary to measure the response time as a unit of a pixel.

FIG. 8 shows a rising time and a falling time at each point. When measuring the luminance change, the temperature of the liquid crystal display panel 41 is maintained at approximately 30° C. and the shutter interval is approximately 0.1 ms. The rising time is between approximately 7.5 ms and 16.5 ms and the falling time is between approximately 6 ms and 13 ms according to the position of the liquid crystal display panel 41. FIG. 8 shows that the difference of response time may be greater than two times according to the positions in a pixel.

The image processing part 61 calculates a response time at each position in a pixel and for each pixel. The image processing part 61 may calculate a response time for at least an entire pixel size.

According to at least the above described embodiments of the invention, the apparatus for measuring response time 10 calculates response time according to various positions within a pixel. As a result, it is possible to detect where the response time is slow so that the defect may be improved. Further, the luminance change according to positions in a pixel in a white state and a black state may be determined.

Figure 9:
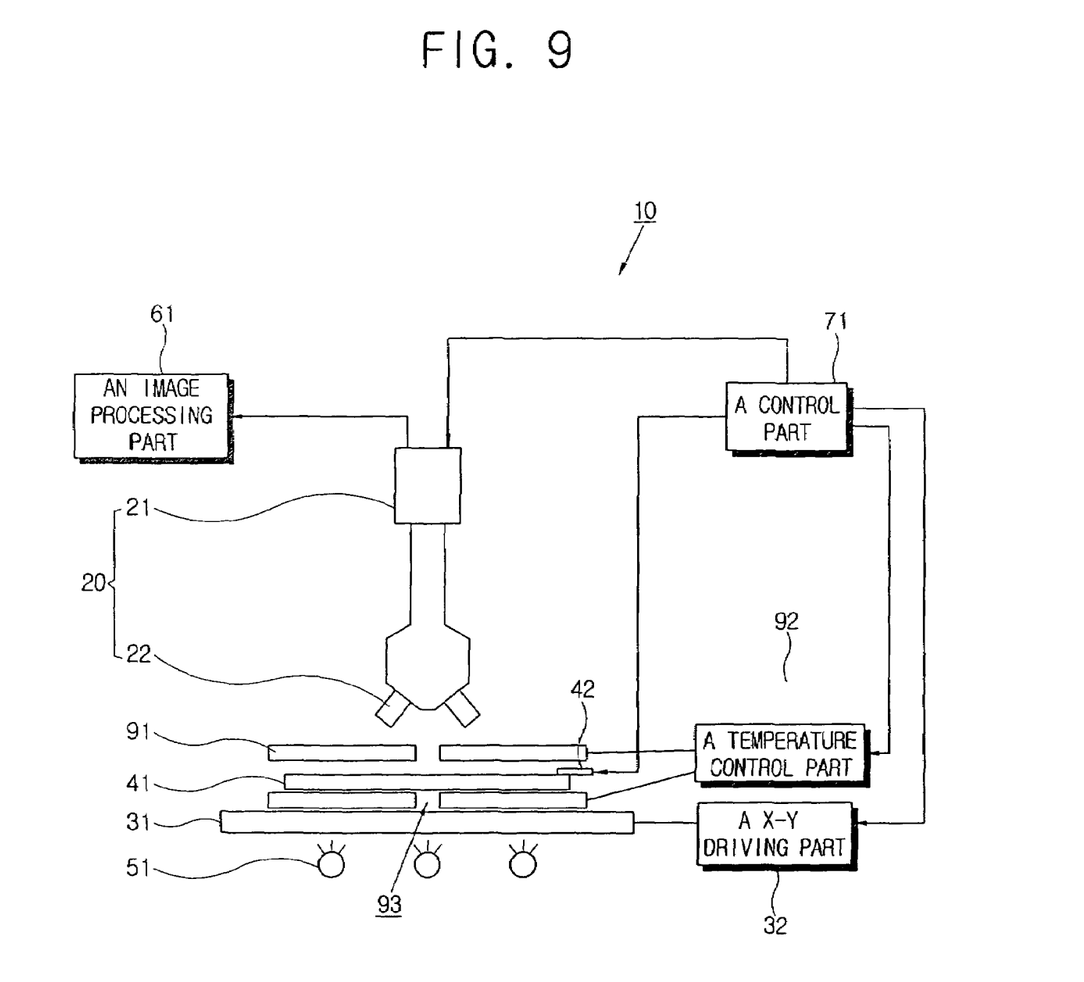
FIG. 9 is a schematic view showing an apparatus for measuring response time according to an embodiment of the invention.

FIG. 9 is a schematic view showing an apparatus for measuring response time according to another embodiment of the invention. Referring to FIG. 9, the apparatus for measuring response time 10 includes a plurality of temperature plates 91 equalizing the temperature of the liquid crystal display panel 41. The liquid crystal display panel 41 may be located between a pair of temperature plates 91. The temperature plates 91 are connected with the temperature control part 92, which controls the temperature thereof. The temperature control part 92 may be controlled by the control part 71.

The temperature plates 91 may include a heating pipe (not shown) that passes through heating fluid and/or a cooling pipe (not shown) that passes through cooling fluid. Additionally, a hole 93 or penetration that enables the light to travel from the lamp unit 51 to the LCD panel may be formed in the temperature plate 91.

According to the above described embodiments of the invention, the liquid crystal display panel 41 is described as the measurement object for the display apparatus; however, it is understood that the invention is not limited thereto.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for measuring a response time of a display apparatus, comprising:
   a photographing part which takes a picture, the photographing part comprising a charge coupled device camera and a microscope;
   an image processing part which receives the picture taken by the photographing part and calculates the response time of each position on the picture; and
   a control part which applies a predetermined image signal to the display apparatus and controls the photographing part to take a picture change of the display apparatus at a predetermined time.

2. The apparatus of claim 1, wherein a shutter interval of the charge coupled device camera is less than approximately 1 ms.

3. The apparatus of claim 2, wherein the shutter interval of the charge coupled device camera is less than approximately 0.1 ms.

4. The apparatus of claim 1, wherein the microscope assists a pixel of the charge coupled device camera to photograph an image in an area that is less than approximately 10 μm.

5. The apparatus of claim 1, wherein the image processing part processes the picture with a luminance change of the picture.

6. The apparatus of claim 1, wherein the charge coupled device camera is a color charge coupled device camera.

7. The apparatus of claim 1, further comprising: a table provided below the photographing part.

8. The apparatus for measuring response time according to claim 7, further comprising: a driving part moving the table.

9. The apparatus for measuring response time according to claim 7, further comparing: a temperature chamber accommodating the table.

10. The apparatus for measuring response time according to claim 7, further comprising: a lamp unit provided below the table.

11. The apparatus of claim 10, wherein the table is made with a transparent material.

12. The apparatus of claim 1, further comprising: a temperature plate provided below the photographing part; and a temperature control part controlling the temperature of the temperature plate.

13. The apparatus of claim 12, wherein the temperature plate includes a first temperature plate and a second temperature plate.

14. The apparatus of claim 12, further comprising: a lamp unit provided below the temperature plate.

15. The apparatus of claim 14, wherein a hole is formed in the temperature plate.

16. The apparatus of claim 1, wherein the display apparatus comprises a liquid crystal display panel.

17. A method for measuring response time of a display apparatus, comprising:
   transmitting a predetermined image signal to the display apparatus;
   taking a picture of a change of the display apparatus at a predetermined interval of time according to the predetermined image signal; and
   calculating the response time of each position on the picture by processing the picture.

18. The method of claim 17, wherein the predetermined interval of time is less than approximately 1 ms.

19. The method of claim 17, wherein the predetermined interval of time is less than approximately 0.1 ms.

20. The method of claim 17, wherein the picture is taken by a pixel of a charge coupled device camera in an area that is less than 10 μm.

21. The method of claim 17, wherein the calculating the response time comprises: calculating the response time of a plurality of positions on the picture.

22. The method of claim 17, further comprising: moving the display apparatus when taking the picture of the display apparatus.

23. The method of claim 17, further comprising: maintaining a temperature of the display apparatus at a constant temperature when taking the picture.

24. The method of claim 17, wherein the display apparatus comprises a liquid crystal display panel.

25. The method of claim 24, further comprising: calculating the response time of each pixel on the liquid crystal display panel.

26. The method of claim 24, wherein the liquid display crystal display panel is a multi-domain mode liquid crystal display panel.

27. The method of claim 26, wherein the display crystal display panel is a patterned vertical alignment mode liquid crystal display panel.

* * * * *